United States Patent
Choi

(10) Patent No.: US 6,831,919 B1
(45) Date of Patent: Dec. 14, 2004

(54) LOW-SPEED SUBSCRIBER EXTENSION TYPE SYSTEM

(75) Inventor: Seong-Rak Choi, Songnam-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 789 days.

(21) Appl. No.: 09/712,902

(22) Filed: Nov. 15, 2000

(30) Foreign Application Priority Data

Nov. 15, 1999 (KR) ......................................... 1999-50537

(51) Int. Cl.$^7$ ............................................. H04L 5/14
(52) U.S. Cl. ................... 370/395.6; 370/463; 370/538; 370/543; 370/545
(58) Field of Search .................... 370/419, 420, 370/463, 395.6, 395.5, 362, 364, 538, 540, 542, 543, 544, 545, 468, 363, 365, 429; 379/325, 326, 327, 328, 329, 330

(56) References Cited

U.S. PATENT DOCUMENTS

| | | | |
|---|---|---|---|
| 5,781,320 A | * 7/1998 | Byers | 398/56 |
| 5,956,344 A | * 9/1999 | Cole | 370/465 |
| 6,147,997 A | * 11/2000 | Holden et al. | 370/395.1 |
| 6,188,690 B1 | * 2/2001 | Holden et al. | 370/390 |
| 6,343,077 B1 | * 1/2002 | Chin et al. | 370/395.6 |
| 6,356,561 B1 | * 3/2002 | Lau et al. | 370/462 |
| 6,452,927 B1 | * 9/2002 | Rich | 370/395.1 |
| 6,487,203 B1 | * 11/2002 | Chung et al. | 370/395.1 |
| 6,690,670 B1 | * 2/2004 | Castellano | 370/395.1 |
| 6,693,911 B2 | * 2/2004 | Yamanaka | 370/395.3 |

FOREIGN PATENT DOCUMENTS

| | | | |
|---|---|---|---|
| JP | 10-327156 | 12/1998 | ........... H04L/12/28 |
| JP | 11-055270 | 2/1999 | ........... H04L/12/28 |
| JP | 11-266266 | 9/1999 | ........... H04L/12/28 |

OTHER PUBLICATIONS

Utopia Level 1 Version 2.01 (af–phy–0017.000), ATM Forum, Mar. 21, 1994.*
Utopia Level 2 Version 1.0 (af–phy–oo30.000), ATM Forum, Jun. 1995.*
Publication ISSN 0285–4139—NEC Technical Journal, Apr. 23, 1995, vol. 48, No. 4, pp. 27–38.

* cited by examiner

Primary Examiner—Wellington Chin
Assistant Examiner—Mark A Mais
(74) Attorney, Agent, or Firm—Cha & Reiter, L.L.C.

(57) ABSTRACT

A low-speed subscriber extension type system interfaces with a switch link through a system backboard, receives a cell transmitted from the switch link, then multiplexes/demultiplexes the received cell through a UTOPIA interface after a switch link and ATM layer processing. A low-speed subscriber physical layer board transmits data, which is physical layer-processed in the low-speed subscriber board, to a low-speed subscriber, and serializes a cell transmitted from the low-speed subscriber board into a clock and data before transmission. Each low-speed extension board exchanges a cell with the low-speed multiplexing/demultiplexing board through a low-speed bus, performs physical layer processing on the cell of the corresponding board, and transmits a received cell to the corresponding subscriber through the low-speed extension physical layer board.

11 Claims, 4 Drawing Sheets

|   | 11 | 7 | | 0 |
|---|---|---|---|---|
| 0 | UDFO(3:0) | PBA ID(3:0) | NOT USED | LINK NO(3:0) |
| 1 | NOT USED ||||
| ⋮ | NOT USED ||||
| 5 | NOT USED ||||
| 6 | HEADER 1 ||||
| ⋮ | HEADER 2 ||||
| ⋮ | UDF 1 ||||
| ⋮ | PAY LOAD 1 ||||
| 32 | PAY LOAD 24 ||||

FIG. 4

LOW-SPEED SUBSCRIBER EXTENSION TYPE SYSTEM

CLAIM OF PRIORITY

This application makes reference to and claims all benefits accruing under 35 U.S.C. Section 119 from an application entitled "LOW-SPEED SUBSCRIBER EXTENSION TYPE SYSTEM" filed in the Korean Industrial Property Office on Nov. 15, 1999 and there duty assigned Serial No. 99-50537.

BACKGROUND OF THE INVENTION

1. Field of the Invention

The present invention relates generally to an asynchronous transfer mode (ATM) switching system. More particularly, the present invention relates to a system for extending the system capacity to accommodate more of the low-speed subscribers in an ATM switching system.

2. Description of the Related Art

The current trend in the ATM switching system demonstrates a decrease in the component size and fabrication cost per port but an increase in the bandwidth of a switch link. Some of the elements of the ATM switching system, such as the switch, subscriber device, controller and network synchronization device, are typically mounted on a single shelf. However, due to the physical limitation of a given single shelf, the number of slots allocated for accommodating subscribers is thus limited to 14 to 16. Moreover, due to the increase demand for more bandwidth in the switch link, 622 Mbps bandwidth is now typically used. Hence, a subscriber board of over DS3 (Digital Signal level Three) class can use the entire bandwidth available in the switch link. Thus, if the subscriber requires a low-speed transmission using the low-speed subscriber board, the bandwidth utilization efficiency of the switch link is inefficient.

With reference to FIG. 1, a simplified block diagram illustrating the capacity of low-speed subscribers in a general ATM switching system is depicted to show the above inefficiency of the bandwidth utilization. The conventional ATM switching system, as shown in FIG. 1, processes an ATM cell stream received through a switch link and transmits the processed ATM cell stream to low-speed subscriber links #0-#N via a line interface unit (LIU) 30. Here, because of the physical limitation of the subscriber board (i.e., the board size is 413 mm×x315 mm), the maximum capacity or number of subscribers is limited within the range of 16 to 32 (i.e., N=31 in FIG. 1). The subscriber capacity is limited by the physical size of the PBA (Physical Block Address). Yet, due to the demand for higher bandwidth and applications in the present state, the transfer rate of the switch link has increased dramatically. Presently, a transfer rate of 622 Mbps is typically used. However, when 32 E1 subscribers requiring a low-speed transmission are accommodated in the system with the bandwidth of 65.536 Mbps (32×2.048 Mbps), a waste of 556 Mbps in the bandwidth occurs as the maximum bandwidth of 622 Mbps is not fully utilized due to the design limitation in the shelf switching system.

SUMMARY OF THE INVENTION

It is, therefore, an object of the present invention to provide a low-speed subscriber extension type system for extending the capacity of low-speed subscribers so as to increase the utilization efficiency of a switch link in an ATM switching system.

To achieve the above and other objects, there is provided a low-speed subscriber extension type system for extending the capacity of low-speed subscribers in an asynchronous transfer mode (ATM) switching system. In this system, a low-speed subscriber board interfaces with a switch link through a system backboard, receives a cell transmitted from the switch link, then multiplexes/demultiplexes the received cell through a UTOPIA interface after switch link and the ATM layer processing. A low-speed subscriber physical layer board transmits data, which is a physical layer processed in the low-speed subscriber board, to a low-speed subscriber and serializes the cell transmitted from the low-speed subscriber board into a clock and data before the transmission. A low-speed multiplexing/demultiplexing board recovers the clock and data from the serial data received from the low-speed subscriber physical layer board via a cable, converts the clock and data to parallel data in a word unit, transmits the parallel data to a corresponding low-speed extension board through a low-speed bus, reads cells received from a given low-speed extension board, multiplexes the read cells, and transmits the multiplexed cells to the low-speed subscriber physical layer board through a link processor. Each low-speed extension board exchanges a cell with the low-speed multiplexing/demultiplexing board through a low-speed bus, performs physical layer processing on the cell of the corresponding board, and transmits a received cell to the corresponding subscriber through the low-speed extension physical layer board.

BRIEF DESCRIPTION OF THE DRAWINGS

The above and other objects, features, and advantages of the present invention will become more apparent from the following detailed description when taken in conjunction with the accompanying drawings in which:

FIG. 4 is a diagram illustrating a cell format according to the embodiment of the present invention.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
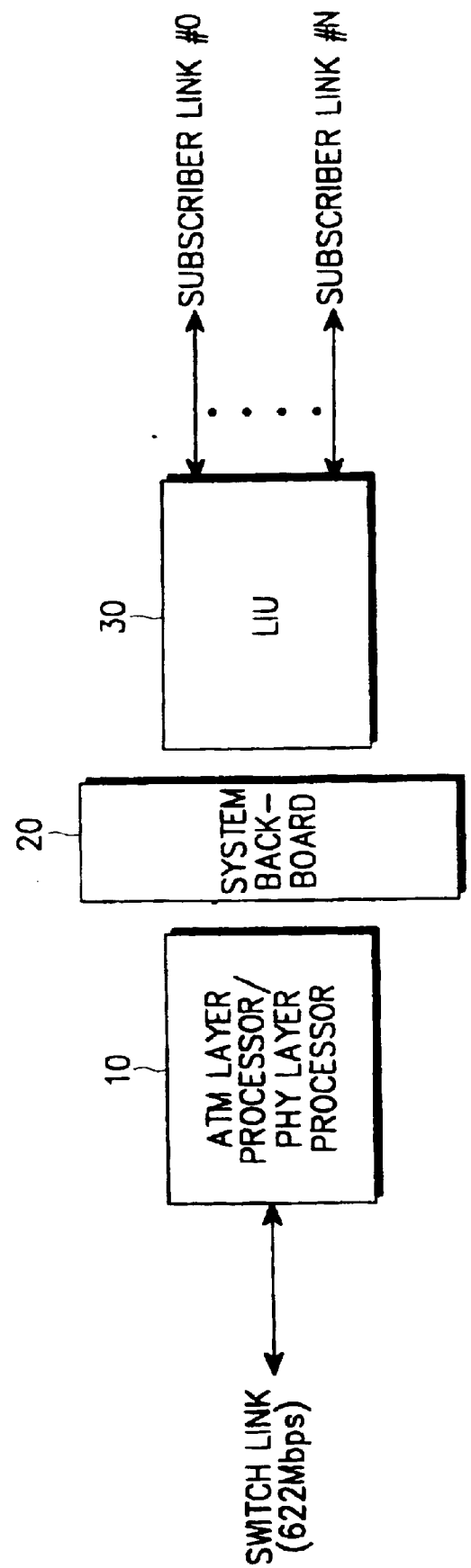
FIG. 1 is a diagram for explaining the capability of low-speed subscribers in a general ATM switching system.
Figure 2:
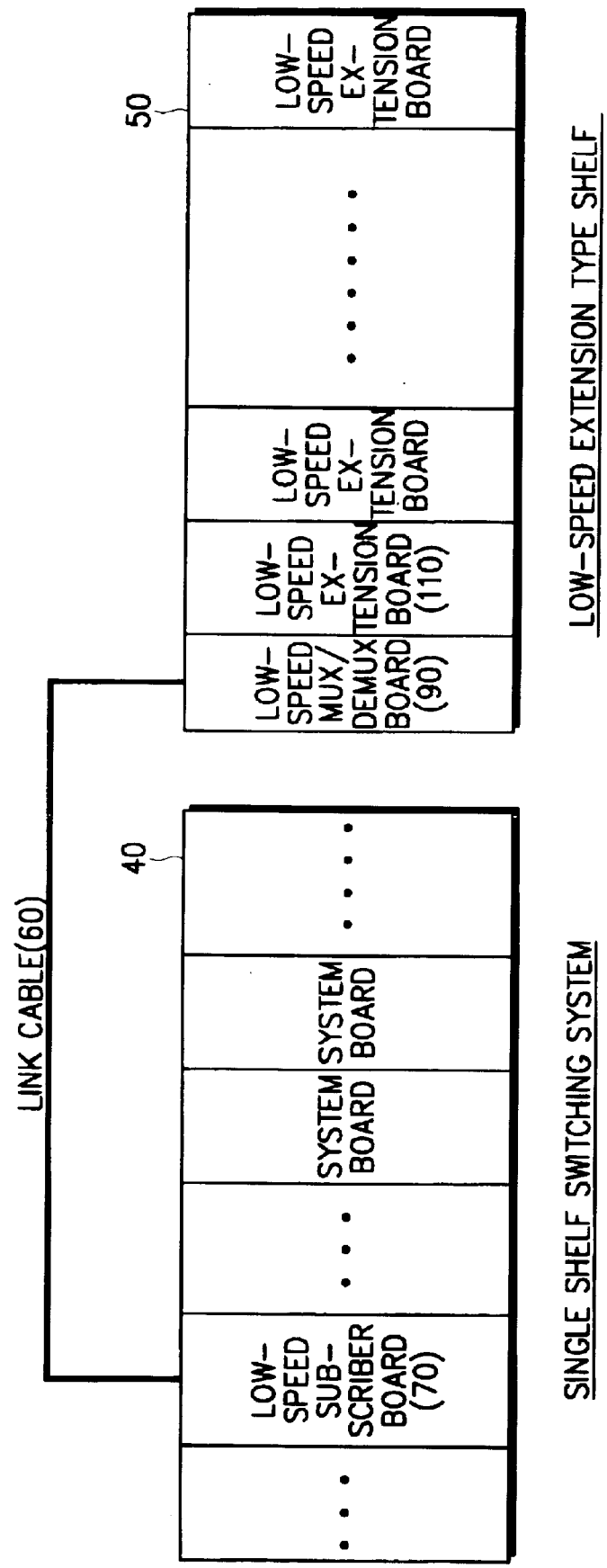
FIG. 2 is a diagram illustrating the structure of a low-speed extension type system according to the embodiment of the present invention.

Referring to FIG. 2, the low-speed extension type system according to the present invention includes a single shelf switching system 40 and a low-speed extension type shelf 50. The single shelf switching system 40 is mounted with a low-speed subscriber board 70 for interfacing with a switching link and for accommodating a plurality of low-speed subscribers, a low-speed subscriber physical layer board (now shown), and a plurality of system boards. The low-speed extension type shelf 50 is mounted with a low-speed multiplexing/demultiplexing board 90 for performing a cell multiplexing/demultiplexing function, a low-speed multiplexing/demultiplexing physical layer board (not shown), a plurality of low-speed extension boards 110 (i.e., 13) for accommodating the extended low-speed subscribers, and a low-speed extension physical layer board. The low-speed subscriber board 70 is connected to the low-speed multiplexing/demultiplexing board 90 through a link cable 60.

Figure 3:
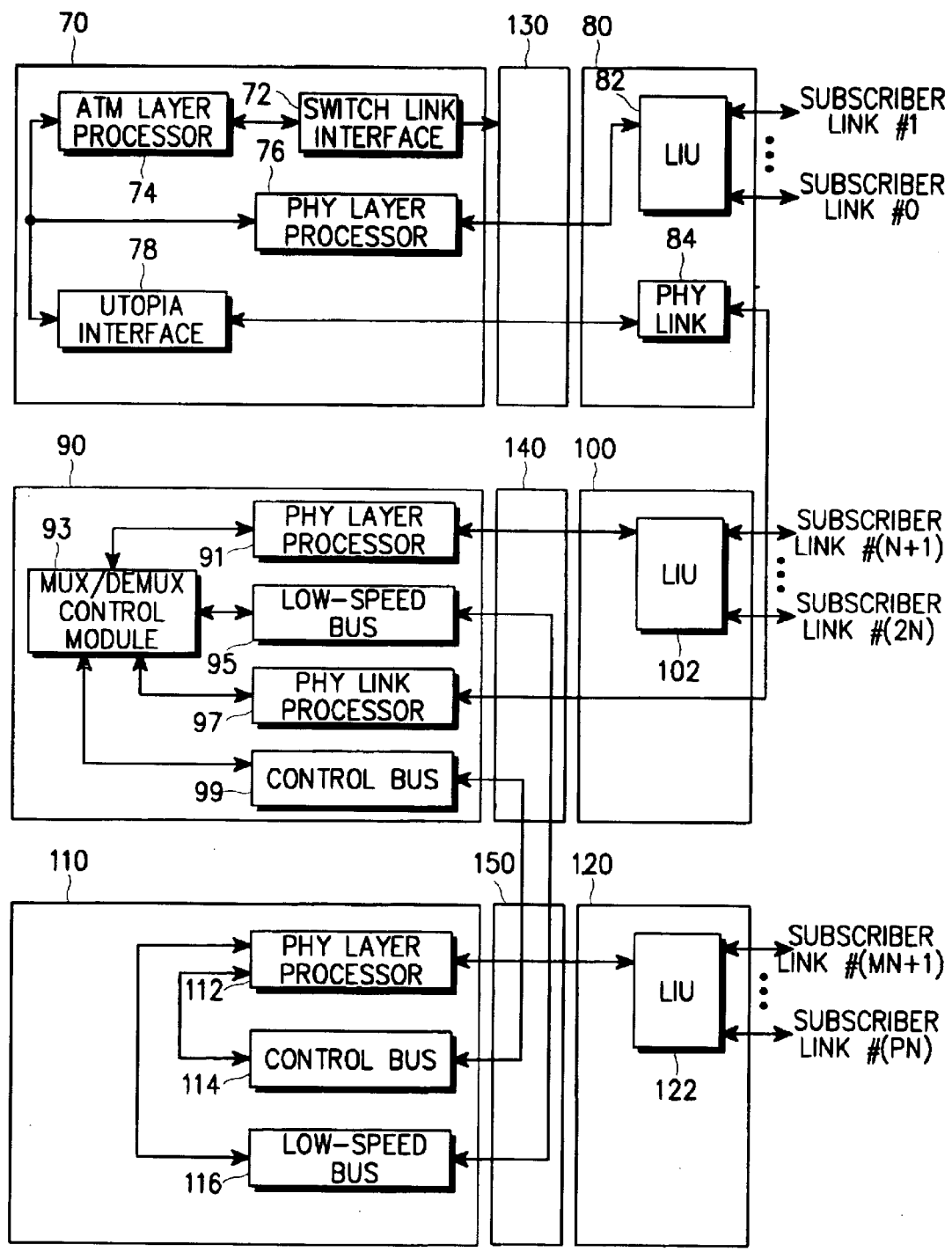
FIG. 3 is a detailed block diagram of the low-speed extension type system shown in FIG. 2.

A detailed structure and operation of the low-speed extension type system will be described below with reference to FIG. 3. Referring to FIG. 3, the low-speed subscriber board 70 interfaces with a switch link through a system backboard 130, receives a cell transmitted from the switch link, performs a switch link operation on the received cell, and performs ATM layer processing. That is, an ATM layer processor 74 receives a cell transmitted from a switch link interface 72, performs ATM layer processing on the received cell, then multiplexes/demultiplexes the processed cell to the low-speed subscribers through a UTOPIA interface 78 and the physical layer processor 76. Since the UTOPIA interface 78 and the physical layer processor 76 can use 32 addresses, the physical layer processor 76 uses 1 address for a loopback test, 16 addresses for 16 subscriber links accommodated in the low-speed subscriber physical layer board 80, and 1 address for the low-speed multiplexing/demultiplexing board 90. This type of UTOPIA-2 address system is shown in Table 1 below.

TABLE 1

| UTOPIA Address (0–31) | Comments |
| --- | --- |
| 0 | Used for loopback in the low-speed subscriber board |
| 1–16 | Used for 16 subscriber links in the low-speed subscriber physical layer board |
| 17 | Used for the low-speed multiplexing/demultiplexing board |
| 18–31 | Unused |

When the UTOPIA-2 address of an input cell is between 1 and 16, the physical layer processor 76 in the low-speed subscriber board 70 receives a cell, performs PLCP (Physical Layer Convergence Protocol) processing on the received cell, then transmits the processed cell to the low-speed subscriber through a corresponding LIU 82 after the E1/T1 frame processing. In the reverse mode, if the physical layer processor 76 receives data from a subscriber accommodated in the low-speed subscriber physical layer board 80 through the LIU 82, the physical layer processor recovers an ATM cell through the PLCP operation after the E1/T1 frame processing and transmits the processed ATM cell for ATM Layer processing through ATM layer processor 74.

A cell format being transmitted/received through the UTOPIA interface 78 is depicted in FIG. 4. In the cell format, an extended cell format of over 53 bytes (here, 64 bytes) is used in consideration of the low-speed buses 95 and 116. When the UTOPIA-2 address received from the physical layer processor 76 falls between 0 and 16, the PBA ID (3:0) and link No. (3:0) of the $0^{th}$ word (shown in FIG. 4) are ignored. The physical layer processor 76 in the low-speed subscriber board 70 selectively receives a cell using the UTOPIA-2 address 1-16, then the received cell is mapped to the subscriber link number accommodated in the low-speed physical board 80. Here, the physical layer 76 provides the received cell to the low-speed subscriber physical layer board 80 after the physical layer processing. However, if the UTOPIA-2 address received by the UTOPIA interface 78 is 17, the UTOPIA interface 78 in the low-speed subscriber board 70 transmits the received cell to the low-speed multiplexing/demultiplexing board 90 via a physical link 84 of the low-speed subscriber physical layer board 80. The functions of the low-speed subscriber physical layer board 80 is to provide PDH (Plesiochronous Digital Hierarchy) format data, which is physical layer-processed by the low-speed subscriber board 70, to the low-speed subscriber through the LIU 82 and transmits a cell to the low-speed multiplexing/demultiplexing board 90 using the physical link 84 by serializing the clock and data. A commercial chip that is readily available in the market, i.e., Agilent Chip HDMP-1637A, and apparent to those skilled in this art is used for the physical link 84.

The low-speed multiplexing/demultiplexing board 90 mounted on the low-speed extension type shelf 50 (FIG. 2) receives an input data through a physical link processor 97, and the physical link processor 97 recovers the clock and data received from the low-speed subscriber board 70, then parallelizes the recovered clock and data into a 16-bit word to recover the cell format as shown in FIG. 4. A multiplexing/demultiplexing control module 93 examines the PBA ID (3:0) inserted in the $0^{th}$ word and transmits the recovered cell to a physical layer processor 91 when the PBA ID value is "0", which signifies that the cell represents a subscriber cell allocated to the low-speed multiplexing/demultiplexing board 90. The physical layer processor 91 detects a link number by extracting the link number of the $0^{th}$ word from the received cell and recovers a 53-byte cell (by removing the words #0–#5 in FIG. 4), then the physical layer processor 91 transmits the data to the subscriber with the corresponding link number through an LIU 102 after the PLCP processing and E1/T1 frame processing. However, if the PBA ID, which represents the number of slot of the low-speed extension shelf, is not "0" but falls between 1 and 13, then the multiplexing/demultiplexing control module 93 transmits the recovered cell to the low-speed extension board 110 via the low-speed bus 95. Moreover, if the PBA ID corresponds to 14 or 15, the multiplexing/demultiplexing control module 93 treats the recovered cell as error and discards it, then records such cancellation by driving a discarded-cell counter for later statistical use.

On the other hand, if the physical layer processor 91 receives data from the low-speed multiplexing/demultiplexing physical layer board 100, the processor 91 recovers an ATM cell through the PLCP operation after the PDH frame processing, then assembles a 64-byte cell and inserts the data-filled subscriber number (or link number) in the link number field of the cell. Subsequently, the physical layer processor 91 inserts the PBA ID of the low-speed multiplexing/demultiplexing board 90 in a PBA ID field, then informs the multiplexing/demultiplexing control module 93 of the arrival of such a cell. The multiplexing/demultiplexing control module 93 of the low-speed multiplex/demultiplex physical layer board 100 reads the arrived cell from the physical layer processor 91 and sends the read cell for ATM layer processing via the link processor 97, link 84, UTOPIA interface 78. The received cell is processed by the ATM layer processor 74 and sent to the destination through the switching link interface 82 accordingly. Similarly, upon the receipt of a cell through the low-speed bus 116 in the low-speed extension board-110, the multiplexing/demultiplexing control module 93 reads the received cell on a round robin basis and transmits the read cell to the low-speed subscriber board 70 through the physical link processor 97.

In the embodiment of the present invention, a recovered clock, which is encoded in a serialized data format at link 84 and decoded at the link processor 97, is distributed to the low-speed extension board 110 and the low-speed extension physical layer board 120 through a low-speed extension type backboard 140. Accordingly, the low-speed multiplexing/demultiplexing board 90 recovers the clock and data from the serial data received through the physical link processor 97 using a commercial link chip, converts the serial data into parallel data in a word unit, then transmits according to the value of the PBA ID (3:0) the converted parallel data to the corresponding low-speed extension board 110 through the low-speed bus 95 or to the corresponding low-speed multiplexing/demultiplexing physical layer board 100 through the physical layer processor 91. In the reverse mode, the low speed board 90 reads the cells received through the low-speed extension board 110 on a round robin basis, multiplexes the read cells, and transmits them to the low-speed subscriber board 70 through the physical link processor 97 and the low-speed subscriber physical layer board 80.

The low-speed extension board 110 controls the low-speed extension physical layer board 120 through a control bus 114, and reads out the cell and extracts PBA ID included in the cell when a cell in the format of FIG. 4 is loaded on a low-speed bus 116. The low-speed extension board 10 compares the extracted PBA ID with a slot number allocated to each low-speed extension board. When the extracted PBA ID is identical to the slot number, the low-speed extension board 110 provides the PBA ID to the physical layer processor 112, recognizing it as a subscriber cell allocated to the corresponding low-speed extension board 110. However, when the extracted PBA ID is not identical to the slot number, the cell is discarded. That is, when a cell is received at the low-speed bus 116, the physical layer processor 112 in the low-speed extension board 110 extracts a link number inserted in the cell, perform PLCP processing and PDH frame processing on the subscriber having the corresponding link number, then transmits the data through an LIU 122 in the low-speed extension physical layer board 120.

In the reverse mode, upon receipt of data transmitted by the subscriber from the low-speed extension physical layer board 120, the physical layer processor 112 assembles a 64-byte cell by extracting an ATM cell after the frame recovery operation and PLCP processing, inserts a link number of the subscriber, who has transmitted the data, in a link number field of the 64-byte cell, inserts PBA ID allocated to the corresponding low-speed extension board in the PBA ID field of the 64-byte cell, then loads it on the low-speed bus such that the multiplexing/demultiplexing control module 93 in the low-speed multiplexing/demultiplexing board 90 reads the cell on the round robin basis. In essence, the low-speed extension board 110 exchanges the cell with the low-speed multiplexing/demultiplexing board 90 via the low-speed bus 116.

Controling the low-speed multiplexing/demultiplexing board 90, the low-speed multiplexing/demultiplexing physical layer board 100, the low-speed extension board 110, and the low-speed extension physical layer boar 120 is performed in the multiplexing/demultiplexing control module 93 through inter-processor communication (IPC). During the IPC communication, when an IPC cell arrives which is defined previously using UDF0 (User Define Function 0) (3:0) in the cell format of FIG. 4, the multiplexing/demultiplexing control module 93 performs the matters instructed by the low-speed subscriber board 70 by analyzing the contents of it and reports the results in the IPC cell format. The control of the low-speed extension board 110 and the low-speed extension physical layer board 120 is performed through the control bus 114 provided in the low-speed extension type backboard 150.

Accordingly, the invention can freely extend the low-speed subscribers, when necessary, by constructing a link between the low-speed subscriber board and a plurality of the low-speed extension boards through the low-speed multiplexing/demultiplexing board.

As described above, the invention can increase the capacity of the low-speed subscribers using the low-speed extension type shelf, contributing to an increase in utilization efficiency of the switch link bandwidth of the ATM switching system.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A system for extending the capacity to accommodate low-speed subscribers in an asynchronous transfer mode (ATM) switching system, comprising:

a subscriber board for interfacing with a switch link via a system backboard, for receiving a cell transmitted from the switch link, and for multiplexing/demultiplexing the received cell via a UTOPIA interface after performing an ATM layer operation;

a physical layer board for exchanging data with the lower-speed subscriber and for serializing the cell transmitted from the subscriber board into a clock and data bits prior to the transmission to the low-speed subscriber;

a multiplexing/demultiplexing board for recovering the clock and data bits received from the physical layer board via a cable, for converting the received clock and data bits to parallel data in a word unit, and for multiplexing the read cells, and for transmitting the multiplexed cells to the physical layer board via a link processor; and a plurality of extension boards for exchanging the cell with the multiplexing/demultiplexing board via a low-speed bus, for performing physical layer operation on the cell received thereon, and for transmitting the received cell to the corresponding low-speed subscriber via the physical layer board.

2. The system as claimed in claim 1, wherein the subscriber board and the physical layer board are mounted on a first shelf in the ATM switching system, and the multiplexing/demultiplexing board and the plurality of the extension boards are mounted on a second shelf.

3. The system as claimed in claim 1, wherein the cell being exchanged through the UTOPIA interface comprises a PBAID (Physical Block Address Identification) for identifying one of the extension boards, a link number for identifying the low-speed subscriber link, and a UDF (User Define Function) data.

4. The system as claimed in claim 2, wherein the multiplexing/demultiplexing board comprises a control module for controlling the physical layer board and the extension boards via inter-processor communication (IPC) protocol.

5. The system as claimed in claim 1, wherein the multiplexing/demultiplexing board reads the cell received from the plurality of the extension boards via the low-speed bus on a round robin basis.

6. The system as claimed in claim 4, wherein the controlling of the low-speed extension board and the low-speed extension physical layer board is performed through a control bus disposed in an extension backboard of the second shelf.

7. A system for accommodating additional subscribers in an asynchronous transfer mode (ATM) switching system, comprising:

a hybrid control means for transporting ATM traffic over a plurality of physical channels, said physical channels having different fixed bandwidth allocations;

a first bandwidth control structure for directing a first physical channel having a first fixed bandwidth allocation;

a second bandwidth control structure for directing a second physical channel having a second fixed bandwidth allocation to a plurality of extension boards, wherein the first fixed bandwidth allocation is greater than the second fixed bandwidth allocation; and wherein the first bandwidth control structure serializes a cell received from a subscriber into clock and data bits, and the second bandwidth control structure receives the serialized clock and data bits, makes a serial to parallel conversion into a word unit for data exchange.

8. The system as claimed in claim 7, wherein the first bandwidth control structure comprises a subscriber board for interfacing with a switch link and for multiplexing/demultiplexing the cell received therein to one of the extension subscribers.

9. The system as claimed in claim 7, wherein the second bandwidth control structure comprises a means for multiplexing/demultiplexing the data exchanged with the first bandwidth control structure.

10. The system as claimed in claim 9, wherein the second bandwidth control structure further comprising a plurality of extension boards for exchanging the data with the multiplexing/demultiplexing means via a low-speed bus and for transmitting the data received therein to one of the subscribers.

11. The system as claimed in claim 7, wherein the data being exchanged between the first and second bandwidth control structures include a PBA ID (Physical Block Address Identification) for identifying one of the extension boards, a link number for identifying the of the subscriber, and a UDF (User Define Function) data.

\* \* \* \* \*